(12) United States Patent
Saini et al.

(10) Patent No.: US 7,932,902 B2
(45) Date of Patent: Apr. 26, 2011

(54) EMITTING RASTER AND VECTOR CONTENT FROM A SINGLE SOFTWARE COMPONENT

(75) Inventors: Shailesh Saini, Seattle, WA (US); Clifton W. Owen, Kirkland, WA (US); Steven P. Kihslinger, Monroe, WA (US); Matthew W. Kernek, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 871 days.

(21) Appl. No.: 11/861,255

(22) Filed: Sep. 25, 2007

(65) Prior Publication Data
US 2009/0079749 A1   Mar. 26, 2009

(51) Int. Cl.
*G06T 1/00* (2006.01)
*G03F 3/08* (2006.01)
*H04N 1/46* (2006.01)
*G06F 17/00* (2006.01)
*G06F 3/00* (2006.01)

(52) U.S. Cl. ......... 345/418; 345/522; 358/1.1; 358/523; 358/524; 715/200; 715/239; 715/249

(58) Field of Classification Search .......... 345/418–420, 345/581, 600, 672, 440–441, 467–468, 522, 345/551, 501, 530; 358/1.1, 523–524; 717/100, 717/107, 108, 114, 120–121, 127, 131; 715/200, 715/249, 250, 273, 239, 236; 382/276, 305; 711/100, 112, 123–125
See application file for complete search history.

(56) References Cited

U.S. PATENT DOCUMENTS

| | | | | |
|---|---|---|---|---|
| 5,761,328 | A * | 6/1998 | Solberg et al. | 382/113 |
| 6,134,358 | A * | 10/2000 | Wu et al. | 385/16 |
| 6,578,197 | B1 | 6/2003 | Peercy et al. | |
| 6,761,427 | B1 * | 7/2004 | Owen et al. | 347/19 |
| 7,164,419 | B2 | 1/2007 | Hill et al. | |
| 7,184,041 | B2 | 2/2007 | Heng et al. | |
| 7,190,468 | B2 | 3/2007 | Brown et al. | |
| 7,385,612 | B1 * | 6/2008 | Peterson | 345/619 |
| 2002/0015055 | A1 | 2/2002 | Foran | |

(Continued)

FOREIGN PATENT DOCUMENTS
WO   WO2006085282 A2   8/2006

OTHER PUBLICATIONS

Wurmlin et al., "3D Video Particles", Institute of Visual Computing, Jul. 29, 2002, pp. 10.

(Continued)

*Primary Examiner* — Wesner Sajous
(74) *Attorney, Agent, or Firm* — Hope Baldauff Hartman, LLC

(57) ABSTRACT

Technologies are described herein for emitting raster and vector content from a single software component. An application program maintains an in-memory representation of a document in an intermediate format. When the application program needs to render the document, it determines whether the target device is a raster or a vector device. The application program then utilizes a single software component to render the document for the target device. The application program provides an instruction to the software component as to whether the in-memory representation should be rendered as vector content or as raster content. In response to receiving the instruction, the software component retrieves the in-memory representation and renders it according to the instruction received from the application program. The rendered content is then provided to the target device.

20 Claims, 3 Drawing Sheets

U.S. PATENT DOCUMENTS

| | | |
|---|---|---|
| 2004/0135838 A1* | 7/2004 | Owen et al. .................. 347/19 |
| 2004/0257367 A1 | 12/2004 | Smith et al. |
| 2005/0041032 A1 | 2/2005 | Hill et al. |
| 2005/0143654 A1 | 6/2005 | Zuiderveld et al. |
| 2005/0286063 A1* | 12/2005 | Owen et al. ................ 358/1.13 |
| 2005/0286759 A1 | 12/2005 | Zitnick et al. |
| 2006/0082577 A1 | 4/2006 | Carter |
| 2006/0114254 A1 | 6/2006 | Day et al. |
| 2006/0209067 A1 | 9/2006 | Pellacini et al. |
| 2006/0274034 A1 | 12/2006 | Yen et al. |
| 2006/0290703 A1 | 12/2006 | White et al. |
| 2007/0002053 A1 | 1/2007 | Hill et al. |
| 2007/0050411 A1* | 3/2007 | Hull et al. ................. 707/104.1 |
| 2008/0281871 A1* | 11/2008 | Wong ........................ 707/200 |
| 2010/0198684 A1* | 8/2010 | Eraker et al. .............. 705/14.49 |

OTHER PUBLICATIONS

Kelley et al., "Hardware Accelerated Rendering of CSG and Transparency", ACM Press, 1994, pp. 8.

* cited by examiner

US 7,932,902 B2

EMITTING RASTER AND VECTOR CONTENT FROM A SINGLE SOFTWARE COMPONENT

BACKGROUND

There currently exist two distinct data types utilized to generate and represent images and other graphical objects on computing systems. These data types are typically referred to as "raster" and "vector" content. Raster content, also referred to as "bitmap" content, consists of a sequence of data representing a generally rectangular grid of picture elements, called "pixels." Raster content generally corresponds pixel-for-pixel with a displayed or printed representation of the content. Because raster data is discrete, it generally does not scale well.

Vector content, on the other hand, refers to content that is represented by description, rather than by listing a value for each pixel in the content. Any geometric shape can be represented as vector content, and any arbitrary shape may be represented by a combination of such geometric shapes, and hence as vector content. For instance, a straight line segment may be described as vector content by describing its two endpoints, or by its slope, length, and origin. Likewise, a circle could be described in vector representation by describing its radius and center point. Accordingly, vector content is sometimes referred to as "geometric" data, since it defines objects by description rather than as a sequence of pixels. Because vector data is continuous, it tends to scale very well.

Due to the differences between vector and raster content, some operations are more easily performed on vector content while others are more easily performed on raster content. For instance, an operation to rescale a vector image generally involves a simple mathematical calculation. As an example, with respect to the vector circle described above, a scaling operation may simply involve multiplying the circle's radius by a desired value. The same operation on a raster circle would involve recalculating the positions of all of the pixels in the image, and potentially interpolating between existing pixels.

Because most current display devices display discrete pixels rather than continuous images, vector content must usually be "rasterized" before it can be displayed. At the same time, however, it is also typically necessary to maintain the vector content in its original format for rendering on a vector target device, such as a laser printer. Due to the significant differences in how vector and raster content is rendered and the differences in the types of target devices for the content, the processing tasks described above have typically been performed by separate software components. The use of multiple components to perform these tasks can lead to complexity, inefficiency, and inconsistency in the rendered output of vector and raster content.

It is with respect to these considerations, and others, that the disclosure presented herein has been made.

SUMMARY

Technologies are described herein for emitting raster content and vector content from a single software component. In particular, through the utilization of the technologies and concepts presented herein, a single software component is configured to emit both raster and vector content. This ensures efficiency and consistency in the rendered output and frees higher-level application programs from having to utilize separate software components to render vector and raster content.

According to one aspect presented herein, an application program maintains an in-memory representation of a document. The document may include raster objects, like three-dimensional objects or image fills, or vector objects like two-dimensional text, shapes, or charts. The application program maintains the in-memory representation in an intermediate format that is neither a raster format nor a vector format. When the application program needs to render the document, the application determines whether the target device for which the document is to be rendered is a raster device or a vector device. For instance, if the document is to be rendered for a display, the target device will generally be a raster device. If the document is to be rendered for a printing device, the target device will generally be a vector device. It should be appreciated that vector display devices and raster printing devices might also be utilized.

Regardless of whether the target device is a raster device or a vector device, the application program utilizes a single software component to render the document for the target device. This component, referred to herein as the "translation component," is a single software component configured to render the in-memory representation of the document into either vector content or raster content. The application program provides an instruction to the translation component as to whether the in-memory representation should be rendered to vector content for use by a vector target device or to raster content for use by a raster target device.

In response to receiving the instruction, the translation component retrieves the in-memory representation and renders it according to the instruction received from the application program. If the target device is a vector device, the rendered vector content is then provided to a target vector device. If the target device is a raster device, the rendered raster content is then provided to a target raster device. According to one implementation, the target raster device comprises a hardware accelerated graphics display device, such as a hardware accelerated graphics adapter. In this manner, a single software component can be utilized to render a document for both printing and for display using accelerated graphics hardware.

It should be appreciated that the above-described subject matter may also be implemented as a computer-controlled apparatus, a computer process, a computing system, or as an article of manufacture such as a computer-readable medium. These and various other features will be apparent from a reading of the following Detailed Description and a review of the associated drawings.

This Summary is provided to introduce a selection of concepts in a simplified form that are further described below in the Detailed Description. This Summary is not intended to identify key features or essential features of the claimed subject matter, nor is it intended that this Summary be used to limit the scope of the claimed subject matter. Furthermore, the claimed subject matter is not limited to implementations that solve any or all disadvantages noted in any part of this disclosure.

DETAILED DESCRIPTION

The following detailed description is directed to technologies for emitting raster content and vector content from a single software component. Through the utilization of the technologies and concepts presented herein, a single software component can render both raster and vector content, thereby freeing higher-level application programs from having to utilize separate software components to render vector and raster content. While the subject matter described herein is presented in the general context of program modules that execute in conjunction with the execution of an operating system and application programs on a computer system, those skilled in the art will recognize that other implementations may be performed in combination with other types of program modules. Generally, program modules include routines, programs, components, data structures, and other types of structures that perform particular tasks or implement particular abstract data types. Moreover, those skilled in the art will appreciate that the subject matter described herein may be practiced with other computer system configurations, including hand-held devices, multiprocessor systems, microprocessor-based or programmable consumer electronics, minicomputers, mainframe computers, and the like.

Figure 1:
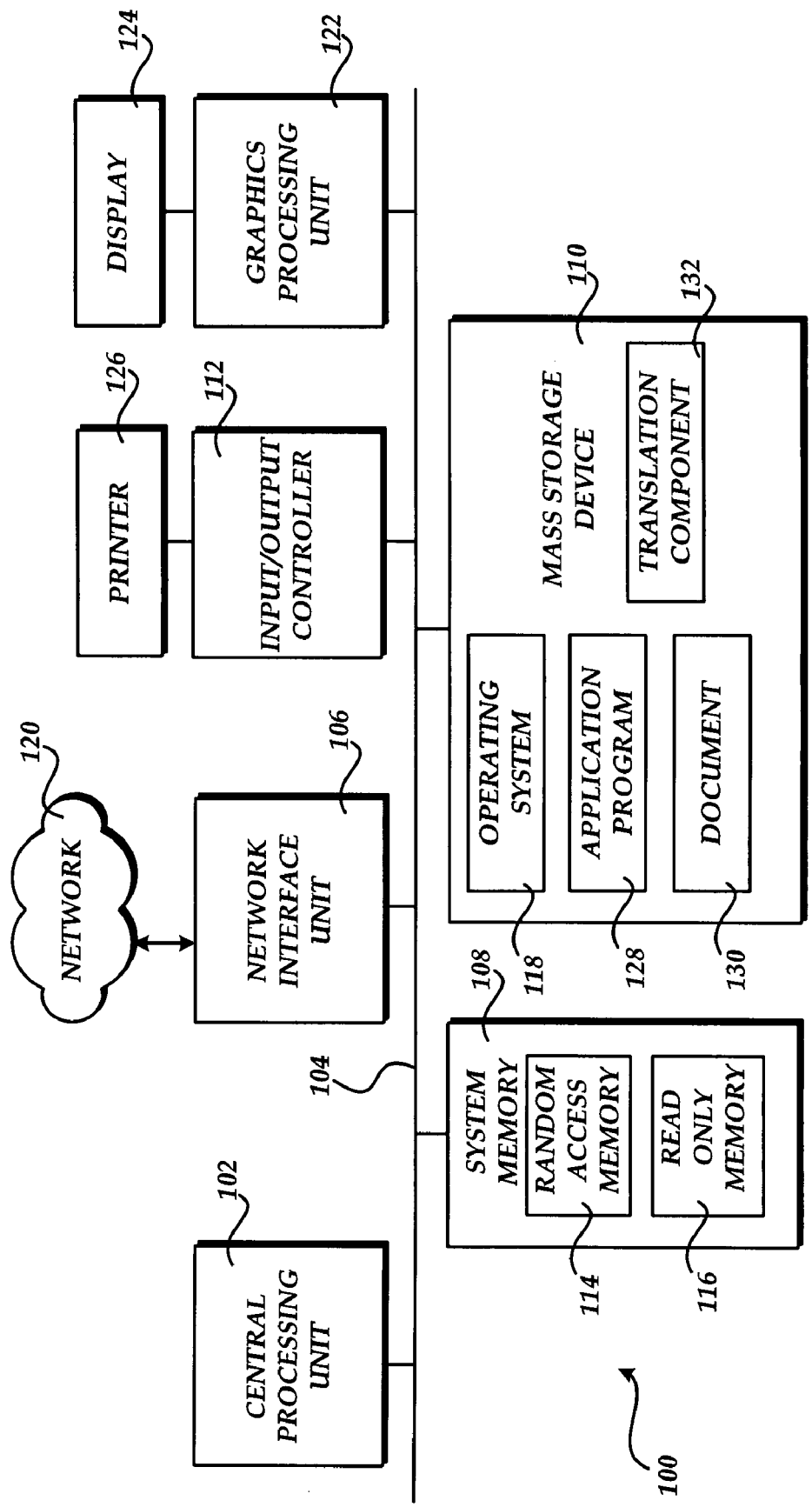
FIG. 1 is a computer architecture diagram showing aspects of an illustrative computer hardware architecture for a computing system capable of implementing the embodiments presented herein.

In the following detailed description, references are made to the accompanying drawings that form a part hereof, and in which are shown by way of illustration specific embodiments or examples. Referring now to the drawings, in which like numerals represent like elements through the several figures, aspects of a computing system and methodology for emitting raster content and vector content from a single software component will be described. In particular, FIG. 1 illustrates a computer architecture for a computer 100 capable of executing the software components described herein for emitting raster content and vector content from a single software component. The computer architecture shown in FIG. 1 may be utilized to embody a conventional desktop, laptop, or server computer capable of executing any of the software components described herein.

The computer architecture shown in FIG. 1 includes a central processing unit 102 ("CPU"), a system memory 108, including a random access memory 114 ("RAM") and a read-only memory ("ROM") 116, and a system bus 104 that couples the memory to the CPU 102. A basic input/output system containing the basic routines that help to transfer information between elements within the computer 100, such as during startup, is stored in the ROM 116. The computer 100 further includes a mass storage device 110 for storing an operating system 118, application programs, and other program modules, which are described in greater detail below.

The mass storage device 110 is connected to the CPU 102 through a mass storage controller (not shown) connected to the bus 104. The mass storage device 110 and its associated computer-readable media provide non-volatile storage for the computer 100. Although the description of computer-readable media contained herein refers to a mass storage device, such as a hard disk or CD-ROM drive, it should be appreciated by those skilled in the art that computer-readable media can be any available computer storage media that can be accessed by the computer 100.

By way of example, and not limitation, computer-readable media may include volatile and non-volatile, removable and non-removable media implemented in any method or technology for storage of information such as computer-readable instructions, data structures, program modules or other data. For example, computer-readable media includes, but is not limited to, RAM, ROM, EPROM, EEPROM, flash memory or other solid state memory technology, CD-ROM, digital versatile disks ("DVD"), HD-DVD, BLU-RAY, or other optical storage, magnetic cassettes, magnetic tape, magnetic disk storage or other magnetic storage devices, or any other medium which can be used to store the desired information and which can be accessed by the computer 100.

According to various embodiments, the computer 100 may operate in a networked environment using logical connections to remote computers through a network such as the network 120. The computer 100 may connect to the network 120 through a network interface unit 106 connected to the bus 104. It should be appreciated that the network interface unit 106 may also be utilized to connect to other types of networks and remote computer systems. The computer 100 may also include an input/output controller 112 for receiving and processing input from a number of other devices, including a keyboard, mouse, or electronic stylus (not shown in FIG. 1). Similarly, the input/output controller 112 may provide output to a printer 126, or other type of output device.

As shown in FIG. 1, a graphics processing unit ("GPU") 122 may also be connected to the bus 104. The GPU 122 is utilized by the computer 100 to drive a video display 124, such as a cathode ray tube ("CRT") display or a liquid crystal display ("LCD"). In one embodiment, the GPU 122 comprises a hardware accelerated GPU. Such a device includes specialized hardware for accelerating the drawing of raster images on the display 124. Rendering raster content through a hardware accelerated GPU is much faster than utilizing the CPU 102 to draw directly to the display 124. Hardware accelerated GPUs are readily available from a variety of vendors, including ATI TECHNOLOGIES of Ontario, Canada and NVIDIA CORPORATION of Santa Clara, Calif., U.S.A.

It should be appreciated that printers, such as the printer 126, are typically vector devices. Vector devices are devices that prefer to receive vector content as input. Vector content refers to content that is represented by description, rather than by listing a value for each pixel in the content. Any geometric shape can be represented as vector content, and any arbitrary shape may be represented by a combination of such, and hence as vector content. It should be appreciated that vector devices, such as printers, can also receive raster content like images as input. Vector content is preferred, however, because it is generally more compact thereby speeding up communication with the vector device. Vector content also typically provides better quality because vector devices have optimized algorithms for converting the vector content for final output. In the case of many types of printers, for instance, received vector content is converted for raster output using internal algorithms that are optimized for printing.

GPUs, on the other hand, are typically raster devices that expect to receive raster content as input. Raster content consists of a sequence of data representing a generally rectangular grid of picture elements, called pixels. Raster content generally corresponds pixel-for-pixel with a displayed or printed representation of the content. Hardware accelerated 3D GPUs also perform functions for accelerating the process of transforming, lighting, texturing, and rasterizing 3D geometric data. The 3D geometric data is most often represented in the form of triangles, with additional data attached to the three points that define the triangle.

Although the embodiments presented herein are described in the context of a raster display device and a vector printing device, it should be appreciated that vector display devices and raster printing devices might also be utilized. Other types of vector and raster devices might also be utilized.

As mentioned briefly above, a number of program modules and data files may be stored in the mass storage device 110 and RAM 114 of the computer 100, including an operating system 118 suitable for controlling the operation of a networked desktop, laptop, or server computer. The mass storage device 110 and RAM 114 may also store one or more program modules. In particular, the mass storage device 110 and the RAM 114 may store an application program 128, a document 130 for use with the application program 128, and a translation component 132.

The application program 128 may comprise any type of application program that renders content to a raster or vector device. For instance, according to embodiments, the application program 128 may comprise a word processing application, a spreadsheet application, a presentation application, or a drawing application. The concepts and technologies presented herein may also be utilized with other types of applications. Additional details regarding the use and operation of these software components are provided below with respect to FIGS. 2-3.

Figure 2:
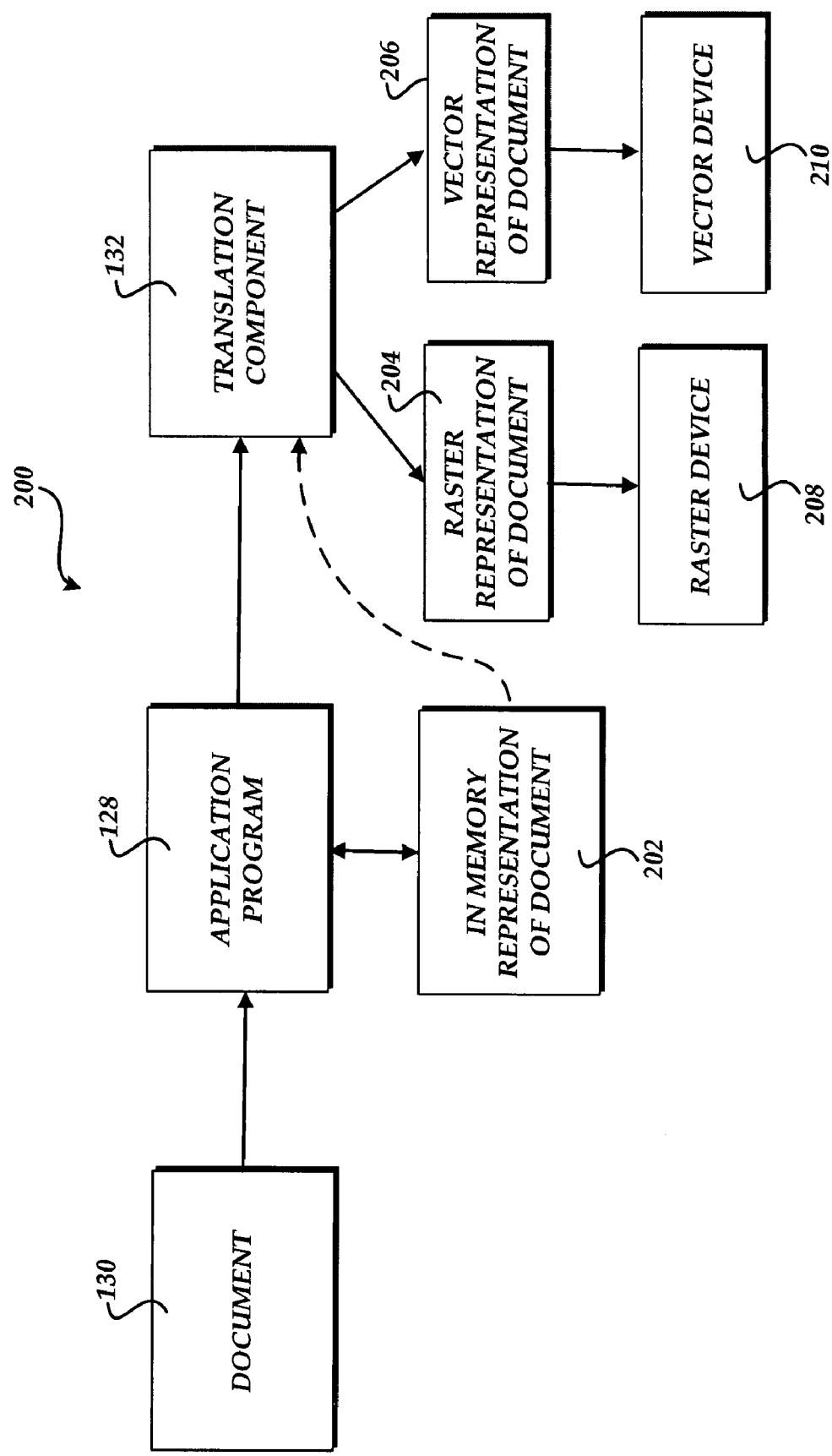
FIG. 2 is a software architecture diagram showing aspects of a software architecture described herein that includes a single software component capable of emitting both raster and vector content.

Turning now to FIG. 2, additional details will be described regarding a software architecture 200 provided in one embodiment presented herein. In particular, the software architecture 200 shown in FIG. 2 includes the application 128 and a document 130. The document 130 represents a document that is compatible with the application program 128 and that is stored on a mass storage device, such as the mass storage device 110. The document 130 may be stored in an open format, such as extensible markup language ("XML"), or may be stored in a proprietary binary format. The document 130 may also define one or more vector objects and one or more raster objects for use by the application program 128. For instance, the document 130 may include raster objects, like three-dimensional objects or image fills, or vector objects like two-dimensional text, shapes, or charts.

When the application program 128 opens the document 130 for viewing, editing, and/or printing, the application program 128 creates an in-memory representation 202 of the document 130 in the RAM 114. The application program 128 constructs the in-memory representation 202 using the document 130 stored on the mass storage device 110. According to embodiments, the application program 128 stores the in-memory representation 202 in an intermediate format that is neither a raster format nor a vector format. For instance, in one implementation, application program 128 may store the in-memory representation 202 as a tree having nodes corresponding to each of the objects defined by the document 130. The nodes in the tree may correspond to text, vector objects, raster objects, or other types of objects. The tree may be traversed to visit each defined object in order to render the in-memory representation of the document 202. Other non-raster and non-vector formats may be utilized for the in-memory representation 202.

When the application program 128 needs to render the document 130, the application program 128 determines whether the target device for which the document is to be rendered is a raster device or a vector device. For instance, if the document 130 is to be rendered for the display 124, the target device will generally be a raster device 208. If the document 130 is to be rendered for the printer 126, the target device will generally be a vector device 210.

Once the application program 128 has determined the type of target device, the application program 128 utilizes services exposed by a single software component to render the document 130 for the target device. In one implementation, this component comprises the translation component 132. The translation component 132 is a single software component configured to render the in-memory representation 202 of the document 130 into either a raster representation 204 of the document 130 (the raster content) or a vector representation 206 of the document 130 (the vector content). According to implementations, the application program 128 provides instructions to the translation component 132 as to whether the in-memory representation 202 should be rendered to vector content for use by a vector device 210 or to raster content for use by a raster device 208.

In response to receiving an instruction from the application program 128 to render the in-memory representation 202 of the document 130, the translation component 132 retrieves the in-memory representation 202 and renders it according to the instruction received from the application program 128. If the target device is a vector device 210, the rendered vector representation 206 is then provided to a target vector device 210. If the target device is a raster device 208, the rendered raster representation 204 is then provided to a target raster device 208. As discussed above, the target raster device 208 may comprise a hardware accelerated graphics display device, such as a hardware accelerated graphics adapter. In this manner, the application program 128 can utilize a single software component, the translation component 132, to render a document 130 for both printing and for display using accelerated graphics hardware. Additional details regarding this process are provided below with respect to FIG. 3.

Figure 3:
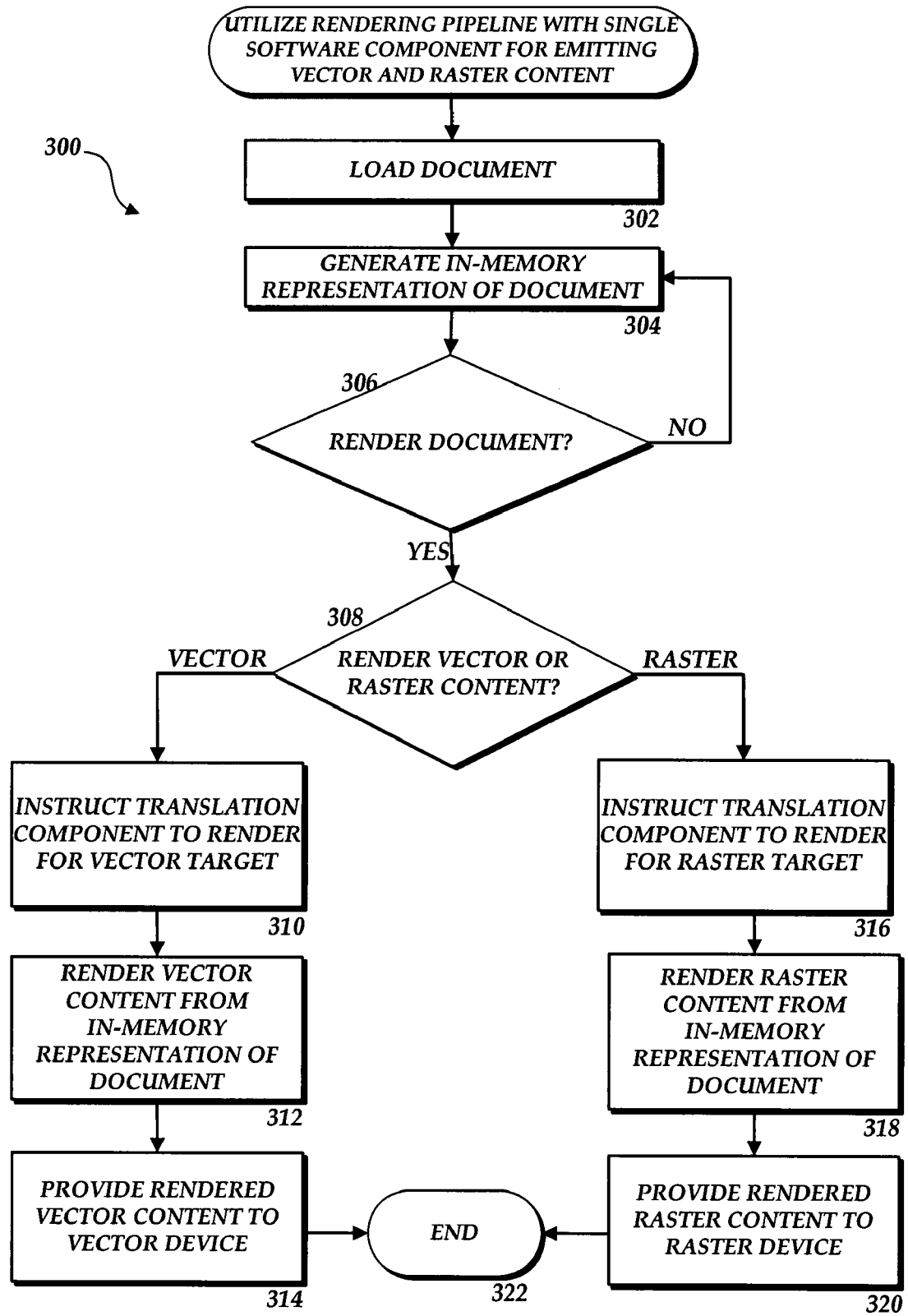
FIG. 3 is a flow diagram showing an illustrative process for providing and executing a single software component capable of executing both vector and raster content in one embodiment presented herein.

Referring now to FIG. 3, additional details will be provided regarding the embodiments presented herein for emitting raster content and vector content from a single software component. In particular, FIG. 3 is a flow diagram illustrating aspects of one method provided herein for utilizing the services provided by the translation component 132. It should be appreciated that the logical operations described herein are implemented (1) as a sequence of computer implemented acts or program modules running on a computing system and/or (2) as interconnected machine logic circuits or circuit modules within the computing system. The implementation is a matter of choice dependent on the performance and other requirements of the computing system. Accordingly, the logical operations described herein are referred to variously as states operations, structural devices, acts, or modules. These operations, structural devices, acts and modules may be implemented in software, in firmware, in special purpose digital logic, and any combination thereof. It should also be appreciated that more or fewer operations may be performed than shown in the figures and described herein. These operations may also be performed in a different order than those described herein.

The routine 300 begins at operation 302, where the application program 128 loads the document 130 from the mass storage device 110. Once the document 130 has been loaded, the routine 300 continues to operation 304, where the application program 128 generates the in-memory representation 202 of the document 130 in the RAM 114. As discussed briefly above, the in-memory representation 202 of the document 130 is maintained in an intermediate format that is neither a raster format nor a vector format. Once the application program 128 has generated the in-memory representation 202, the routine 300 continues from operation 304 to operation 306.

At operation 306, a determination is made as to whether the document 130 should be rendered. For instance, the document 130 may be periodically rendered for viewing on the display 124. A request may also be received to render the document 130, for instance, for printing on a printer 126. If a request to render the document is received, the routine 300 continues to operation 308, where the application program 128 determines whether the target device for rendering is a vector device 210 or a raster device 208. If the target device is a vector device 210, the routine 300 proceeds from operation 308 to operation 310. If the target device is a raster device, the routine 300 proceeds from operation 308 to operation 316.

At operation 310, the application program 128 instructs the translation component 132 to render the document 130 for a vector device 210. The routine 300 then continues to operation 312, where the translation component 132 receives the instruction and renders the vector representation 206 of the document 130 from the in-memory representation 202 of the document 130. Once the vector representation 206 has been generated, the rendered vector content is provided to the appropriate vector device 210.

At operation 316, the application program 128 instructs the translation component 132 to render the document 130 for a raster device 208. The routine 300 then continues to operation 318, where the translation component 132 receives the instruction and renders the raster representation 204 of the document 130 from the in-memory representation 202 of the document 130. Once the raster representation 204 has been generated, the rendered raster content is provided to the appropriate raster device 208. From operations 314 and 320, the routine 300 continues to operation 322, where it ends.

Based on the foregoing, it should be appreciated that technologies for emitting raster content and vector content from a single software component are provided herein. Although the subject matter presented herein has been described in language specific to computer structural features, methodological acts, and computer readable media, it is to be understood that the invention defined in the appended claims is not necessarily limited to the specific features, acts, or media described herein. Rather, the specific features, acts and mediums are disclosed as example forms of implementing the claims.

The subject matter described above is provided by way of illustration only and should not be construed as limiting. Various modifications and changes may be made to the subject matter described herein without following the example embodiments and applications illustrated and described, and without departing from the true spirit and scope of the present invention, which is set forth in the following claims.

What is claimed is:

1. A computer-implemented method for emitting raster content and vector content from a single software component, the computer-implemented method comprising performing computer-implemented operations on a computer for:
    maintaining in a memory of the computer an in-memory representation of a document by way of an application program; and
    executing a single software component for rendering the document on the computer, the single software component configured to render the in-memory representation into vector content or raster content based on instructions received from the application program.

2. The method of claim 1, further comprising providing the rendered vector content to a vector device.

3. The method of claim 2, further comprising providing the rendered raster content to a raster device.

4. The method of claim 3, wherein the raster device comprises a hardware accelerated graphics display device.

5. The method of claim 4, wherein the application program is operative to maintain the in-memory representation of the document in an intermediate format that is not a vector format or a raster format.

6. The method of claim 5, wherein the instructions identify the vector device or the raster device.

7. The method of claim 6, wherein the document comprises one or more vector objects and one or more raster objects.

8. The method of claim 7, wherein the vector objects comprise one or more two-dimensional shapes, two-dimensional charts, or two-dimensional text, and wherein the raster objects comprise one or more three-dimensional objects or image fills.

9. A computer storage medium having computer-executable instructions stored thereon which, when executed by a computer, cause the computer to:
    provide a single software component configured to render both raster content and vector content from a in-memory representation of a document maintained by an application program in an intermediate format based on instructions received from the application program at the single software component identifying a render target for the document.

10. The computer storage medium of claim 9, having further computer-executable instructions stored thereon which, when executed by the computer, cause the computer to:
    receive an instruction from the application program at the single software component, the instruction identifying a render target for the document; and
    based on the instruction, to execute the single software component to render the document as raster content suitable for use by a raster render target or as vector content suitable for use by a vector render target.

11. The computer storage medium of claim 10, wherein the document is rendered as vector content and wherein the computer-readable medium has further computer-executable instructions stored thereon which, when executed by a computer, cause the computer to provide the rendered vector content to a vector device.

12. The computer storage medium of claim 10, wherein the document is rendered as raster content and wherein the computer-readable medium has further computer-executable instructions stored thereon which, when executed by a computer, cause the computer to provide the rendered raster content to a raster device.

13. The computer storage medium of claim 12, wherein the raster device comprises a hardware accelerated graphics display device.

14. The computer storage medium of claim 13, wherein the intermediate format is neither a vector format nor a raster format.

15. The computer storage medium of claim 14, wherein the instruction identifies the vector device or the raster device.

16. The computer storage medium of claim 15, wherein the document comprises one or more vector objects and one or more raster objects.

17. The computer storage medium of claim 16, wherein the vector objects comprise one or more of two-dimensional text, two-dimensional shapes, or two-dimensional charts, and wherein the raster objects comprise one or more three-dimensional objects or image fills.

18. An apparatus configured to emit raster content and vector content from a single software component, the apparatus comprising:
    a memory storing an application program and a translation component, the application program configured to maintain an in-memory representation of a document in an intermediate format and the translation component configured to receive a request from the application program to convert the in-memory representation of the document to vector content for a vector device or to raster content for a raster device; and a processor operative to execute the application program and the translation component stored in the memory.

19. The apparatus of claim 18, further comprising a hardware accelerated graphics display device configured to display the raster content rendered by the translation component.

20. The apparatus of claim 19, wherein the intermediate format is not a vector format or a raster format.

* * * * *